July 19, 1960
M. B. MENTLEY
2,945,424
GEAR FINISHING WITH LEAD CORRECTION
Filed Jan. 16, 1956
2 Sheets-Sheet 2
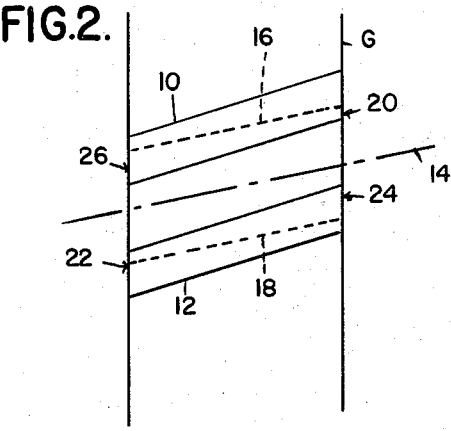
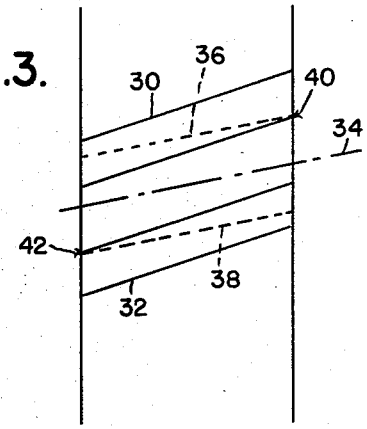
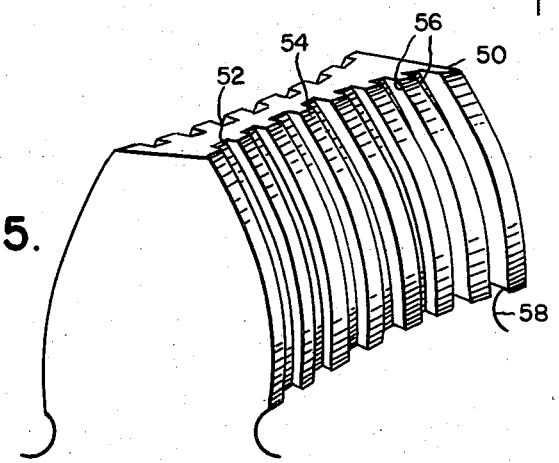
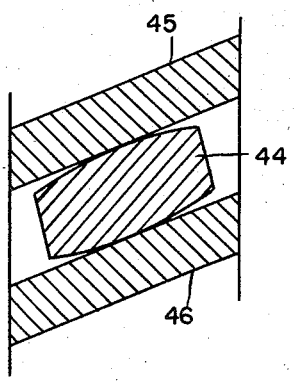
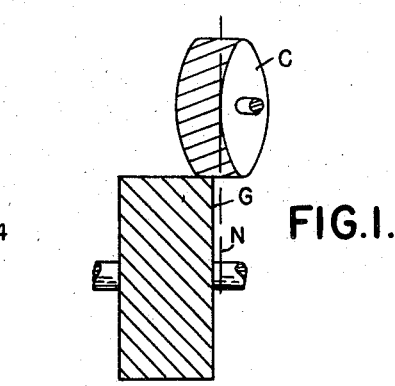
INVENTOR.
MAX B. MENTLEY
BY Whittemore,
Hulbert & Belknap
ATTORNEYS United States Patent Office 2,945,424
Patented July 19, 1960

2,945,424
GEAR FINISHING WITH LEAD CORRECTION

Max B. Mentley, Detroit, Mich., assignor to National Broach & Machine Company, Detroit, Mich., a corporation of Michigan Filed Jan. 16, 1956, Ser. No. 559,197

8 Claims. (Cl. 90—1.6)

The present invention relates to gear finishing with lead correction.

A large proportion of high accuracy gears in use today are finished to accurate dimensions by a crossed axes gear shaving operation. In this operation a gear and gear-like shaving cutter are meshed with their axes crossed at a small angle, as for example between 3 and 30 degrees. Either the gear member or cutter member is then driven in rotation, the other of the two members being driven solely as a result of the meshed relation between the members. The gear shaving cutter is provided with a multiplicity of cutting edges which extend generally up and down the flanks of the teeth of the cutter. Due to the crossed relationship between the axes of the gear and cutter, relative sliding between the teeth of the gear and cutter takes place and material is shaved from the surfaces of the teeth of the gear. In order to distribute the shaving action from end to end of the gear teeth, a relative translation or traverse is provided between the members in a direction to cause the common perpendicular to the axes to shift from one side to the other of the gear. In a simple case this relative traverse may be parallel to the axis of the gear. In some cases however it is preferred to provide relative traverse in a direction which is diagonal both to the axes of the gear and cutter.

As practiced prior to the present invention the initial setup was such that the common perpendicular to the axes of the gear and tool was located at one side of the gear before initial translation. In some cases the traverse involved forward and reverse travel accompanied by a reversal in the direction of rotation of the member, and in other cases more than a single complete reciprocation was employed. In any case, the cutting or shaving action resulting from the operation takes place simultaneously at both sides of the teeth of the gear. While the cutting action is not exactly uniform, nevertheless cutting takes place to approximately the same depth at both sides of the teeth of the gear.

While the gear shaving operation as described in general terms above is very satisfactory and has been adopted widely for use in processing gears requiring a high degree of accuracy, there is some difficulty in completely correcting errors in lead or helix angle in the gear being shaved. This is largely due to the fact that either the cutter member or the gear member (and ordinarily the cutter member) is positively driven in rotation, but the other member is mounted for free rotation and is driven solely through the meshed relationship between the gear member and cutter member. Accordingly, if the teeth of the gear are initially formed with a lead or helix angle error, there is a tendency for the cutter to follow this error and to correct it only in part.

The present invention overcomes the difficulty in a gear shaving operation in correcting lead or helix angle errors. The present invention finds an important field of utility in the correction of large gears, such for example as marine gears.

It is an object of the present invention to provide a method of correcting lead or helix angle error in gears which involves the removal of a minimum amount of material and accordingly, a minimum reduction in tooth thickness of the shaved gear.

It is a further object of the present invention to provide a method of correcting lead or helix angle in gears in which the gear-like shaving cutter is initially fed radially inwardly with respect to a gear while located substantially centrally between opposite sides of the gear, and thereafter is relatively traversed a short distance to machine a central portion of the gear teeth to correct lead, and thereafter fed further in a radial direction followed by further relative traverse to extend the correspondingly machined central portions of the teeth to the ends thereof.

Other objects and features of the invention will become apparent as the description proceeds, especially when taken in conjunction with the accompanying drawings, wherein:

Figure 1 is a diagrammatic view illustrating the meshed relationship between a gear and cutter to perform a shaving operation.

Figure 2 is a diagrammatic view illustrating the type of metal removal inherent in prior gear shaving operations intended to correct lead.

Figure 3 is a diagrammatic view similar to Figure 2 showing the manner of metal removal resulting from the practice of the present invention.

Figure 4 is a diagrammatic view illustrating the relationship between a tooth of a cutter and the two adjacent teeth of a gear.

Figure 5 is an enlarged perspective view of a tooth of a cutter provided with hollow lead.

Figure 6:
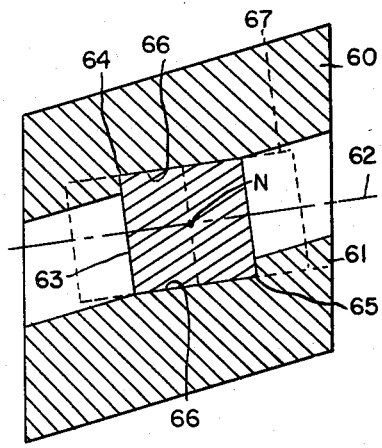
Figure 6 is a diagrammatic view illustrating sequential positions of a tooth of a cutter relative to two adjacent teeth of a gear during the lead correcting operation.

Referring now to Figure 1 there is illustrated a work gear G in mesh with a gear shaving cutter C. It will be observed that the teeth of the gear and cutter are both helically disposed at such an angle as to require a crossed relationship between the axes of the gear and cutter when the teeth thereof are in mesh. In this figure the gear is illustrated as of substantial width and size such for example as a marine gear.

As illustrated in Figure 1, it will be observed that the gear and cutter are relatively located so that the cutter is at one side of the gear. More specifically, the arrangement is such that the single line which is perpendicular at once to the axis of the cutter C and to the axis of the gear G is located at one side of the gear G. This common perpendicular or normal is indicated diagrammatically at N.

In order to shave the gear G with the parts in relationship illustrated in Figure 1 the following takes place. In the first place, the teeth of the cutter C are in mesh with the teeth of the gear G. One of the members, and ordinarily the cutter C, is now driven in rotation. The gear G is at this time mounted for free rotation and accordingly, it is rotated through its meshed engagement with the cutter C. At the same time, relative traverse is provided as for example, by traversing the gear G to the right in the direction of its axis. Cutting edges as will subsequently be described in connection with Figure 5, are provided on the teeth of the cutter C and these remove shavings of metal from the teeth of the gear G. At this time the pressure which results in the shaving cut is provided by the reaction between the teeth of the gear and cutter. Accordingly, cutting necessarily takes place on both sides of the teeth of the gear.

Ordinarily the gear shaving operation comprises at least one complete reciprocation as for example, movement of the gear from the position shown to a position in which the common normal N lies at the left hand side thereof, followed by a return or reverse traverse to the illustrated position. Ordinarily, the direction of rotation of the parts is reversed upon reversal of the direction of travel. In many cases two or more complete back and forth relative reciprocations is provided.

While the relative traverse may take place in the direction of the axis of the gear G, as mentioned above, it may also take place in a direction which is oblique to the axes of both the gear and cutter, so long as the direction of relative traverse occupies a plane which is parallel both to the axes of the gear and cutter, and so long as it does not take a direction parallel to the axis of the cutter. This type of reciprocation is known in the art as diagonal traverse and in some cases requires the use of a cutter of substantially greater width than suggested in Figure 1.

Referring now to Figure 2, there is illustrated diagrammatically a portion of a gear G having teeth 10 and 12. The desired land or helix angle of these teeth is indicated by the construction line 14. Employing the arrangement illustrated in Figure 1, it will be observed that the teeth 10 and 12 may be brought to correct lead or helix angle only by removing material to the dotted lines indicated at 16 and 18 respectively. It will further be noted that at the points 20 and 22 material is removed whose removal is not required for the correction of lead or helix angle. This of course is due to the fact that cutting can take place at the zones indicated generally at 24 and 26 only when cutting is taking place at the confronting surface of the next adjacent tooth.

This is a serious difficulty since in most cases gear teeth are hobbed or shaper cut so as to leave a minimum amount of material for the final finishing or shaving operation. If a substantial lead error develops, in many cases insufficient material is provided on the surfaces of the teeth to permit complete correction without producing undersize teeth.

In accordance with the present invention the lead correcting operation is represented diagrammatically in Figure 3. In this figure there is illustrated diagrammatically a portion of a gear having teeth 30 and 32. The desired lead or helix angle of these teeth is indicated by the construction line 34. Employing the present method, the teeth 30 and 32 are shaved to a depth indicated by the dotted lines 36 and 38 respectively. It will be observed that the line 36 represents the removal of no material at the points 40 and 42. Thus, the teeth 30 and 32 have been machined to a true lead or helix angle with the removal of a minimum amount of metal. This desirable result is accomplished by the method which will now be described.

Referring first to Figure 4, there is indicated a tooth 44 of a cutter disposed between teeth 45 and 46 of a gear. This diagrammatic view may be considered as resulting from development of a cylindrical section taken at the pitch cylinder of the gear. If it is assumed that the teeth of the gear are uniform from end to end, they appear in this section as parallelograms. On the other hand, if it is assumed that the teeth of the cutter are uniform from end to end, opposite sides of the cutter teeth appear as convex curves due to the fact that the cylinder on which the section is taken is concentric with the axis of the gear.

While the present method may be carried out with substantial advantages employing a cutter having unmodified teeth, as suggested in Figure 4, it is preferred to employ a cutter having teeth modified as indicated in Figure 5. In this figure a cutter tooth 50 of involute form is indicated as having its opposite sides convex longitudinally or from end to end. In other words, the end portions of the tooth 50 are thicker than central or intermediate portions thereof. As is now well understood in the art, such a tooth if provided with the proper longitudinal convexity or "hollow lead" may contact the teeth of a conjugate gear uniformly from end to end. On the contrary, unmodified cutter teeth of the type suggested in Figure 4 have limited area contact centrally thereof with the teeth of the gear, or in a zone as determined by the location of the common perpendicular to the axes of the meshed gear and cutter.

The oposite flanks of the teeth 50 are provided with vertically extending grooves or channels 52 leaving ribs 54 therebetween. The top corners of the ribs, as indicated by the reference numeral 56, constitute cutting edges. Preferably, the root portions of the teeth are cut away as indicated at 58 to provide an arcuate through channel.

In the present operation the grooves or channels 52 on successive teeth may be arranged to extend with a small lead around the circumference of the cutter. In other words, corresponding cutting edges on the teeth of the cutter do not occupy a single plane of rotation. These types of grooves, channels or serrations are disclosed in prior Mentley Patent 2,329,284 granted September 14, 1943. With grooves, channels or serrations disposed as disclosed in the aforesaid prior patent there may be provided a uniform advance of cutting action on the teeth of a gear in mesh therewith at crossed axes independent of any relative traverse between the gear and cutter.

Referring now to Figure 6 there is illustrated a pair of adjacent teeth 60 and 61 of a gear. It will be observed that the angularity of these teeth is substantially different from the true or desired lead or helix angle which is indicated by the dot and dash line 62. In accordance with the present invention a gear shaving cutter preferably having teeth provided with the hollow lead modification disclosed in Figure 5, is brought into mesh centrally with respect to the gear. In other words, in the initial position the common normal N to the axes of the gear and cutter occupies the position illustrated in Figure 6. At this time the cutter and gear are rotated at cutting speeds and are relatively fed in a direction radial with respect thereto, such direction being along the common normal or perpendicular N. It is important to note that at this time no traverse axially of the gear or in a plane parallel to the axis of the gear and cutter is provided. As a result of the aforesaid relative radial feed during cutting rotation, a tooth 63 of the cutter cuts its way into the sides of the teeth 60 and 61 of the gear. This radial feed is terminated when the teeth 63 of the cutter are in contact at both sides from end to end thereof with the teeth 60 and 61 of the gear. It will be appreciated that due to the false or erroneous helix angle or lead of the teeth of the gear, initial contact during radial feed between the teeth 63 of the cutter and the teeth 60 and 61 of the gear took place at the corners 64 and 65 of the teeth 63. When radial feed has been terminated with the parts in the position illustrated in Figure 6, the surfaces indicated at 66 on the gear teeth 60 and 61 are accurately machined guiding surfaces which extend at approximately the true lead. While the lead thus produced is approximately the true desired lead, it differs slightly therefrom since at this time the gear and cutter have a greater than final desired center distance. This completes the first step of the lead correction operation.

The second step of the operation takes advantage of the accurately machined guiding surfaces 66 and uses these surfaces in extending the machined surfaces toward the ends of the gear teeth. Before describing this operation attention is directed to the fact that while cutting edges 56 are provided at the sides of the ribs 54, the end corners of the teeth 50 of the cutter also constitute cutting edges and an efficient operation known as end cutting can be carried out. Accordingly, with the parts in the full line position illustrated in Figure 6, and while rotation of the gear and cutter is continued, a relative traverse is introduced in a plane parallel to the axes of the gear and cutter and in a simple case, parallel to the axis of the gear. The amplitude of this traverse is carefully selected such that throughout the traverse, the teeth of the gear and cutter remain in accurately supported true guiding relation. It is found that accurate results are obtained when the traverse is limited to the amount indicated by the dotted line positions of the cutter tooth 63 or a position in which substantially one-half of the cutter teeth at one end thereof remains fully supported between the machined surfaces 66 on the gear teeth. During relative traverse which brings the cutter tooth 63 to the position shown in dotted lines at the right of Figure 6 it will of course be observed that the side 67 thereof comes out into the space between the teeth 60 and 61. At this time the corner 65 however, is cutting into the tooth 61 and the cutter tooth 63 at this time remains adequately supported throughout substantially one-half of its length between the surfaces 66. The direction of relative traverse is reversed and traverse is carried out until the cutter tooth 63 occupies the relative position indicated in dotted lines at the left in Figure 6. Thereafter, preferably the cutter is again centralized with respect to the gear although this is not strictly necessary.

Figure 7:
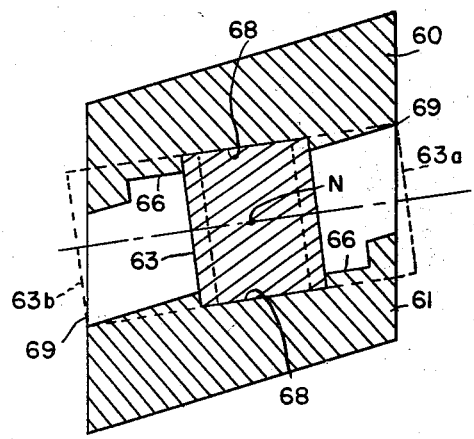
Figure 7 is a view similar to Figure 5 illustrating a further step in the lead correcting operation.

In any case the next operation is a second radial feed carried out without relative traverse during continued rotation of the gear and cutter. At this time the cutter tooth 63 is fed into a position as indicated in Figure 7 machining new guiding and support surfaces 68 which also extend in true relationship with respect to the desired lead or helix angle of the teeth 60 and 61 of the gear. After the radial feed has been terminated, relative traverse between the gear and cutter is again accomplished in opposite directions to the dotted line positions illustrated in Figure 7. When the tooth 63 occupies the position illustrated in dotted lines at 63a it will be observed that it will have machined the right hand end of the tooth space between the teeth 60 and 61 to the correct lead and completely to the end of the teeth. Thereafter, upon reverse reciprocation which brings the cutter tooth 63 to the relative position indicated in dotted lines at 63b, the opposite ends of the tooth space will have been machined to the correct lead.

It will be observed that this operation has been carried out with the minimum removal of metal at the points 69 so that the lead has been corrected by removal of a minimum amount of material.

In the foregoing operation the correction of lead was accomplished during relative rotation by (1) radial feed, (2) limited traverse axially of the gear or in a plane parallel to the axes of the gear and cutter, terminated before the teeth of the cutter lose adequately guided support from the machined surfaces of the gear teeth, (3) further radial feed in the absence of reciprocation or traverse, and (4) traverse to extend the finishing action to the ends of the teeth of the gear. Obviously of course, in some cases the operation may require more than two stages each of which is initiated by radial feed without reciprocation.

Figure 8:
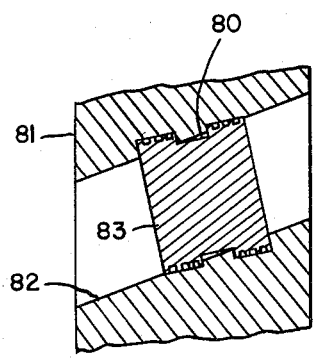
Figure 8 is a diagrammatic view illustrating the use of a modified cutter.

It has been found in some cases that the operation of sinking the cutter teeth to required depth by radial feed is facilitated if the central portion of the cutter teeth is relieved as indicated at 80 in Figure 8. In this figure portions of an adjacent pair of gear teeth are indicated at 81 and 82. The cutter tooth 83 may be provided with serrations as illustrated in Figure 5 and is preferably of the hollow lead modification type there illustrated. Alternatively, instead of relieving the entire central portion of the cutter, a similar result may be accomplished by providing relatively narrower lands and correspondingly wider grooves or channels in serrating the cutter.

While end cutting is an efficient cutting operation, as suggested above, in some cases it may be desirable to prevent true end cutting, in which case the appropriate corners of the teeth of the cutter may be chamfered so as to shift the cutting action inwardly from the true end surfaces thereof.

The present invention is sharply distinguished from prior shaving practice in that the cutter teeth are sunk to depth in an operation which is not sensitively affected by lead errors and thus results in the production of true guiding surfaces on the teeth of the gear which extend at the theoretically correct or desired lead or helix angle. Thereafter, employing this surface and other surfaces produced as guiding surfaces, the finishing action is extended progressively toward and finally completely to the ends of the gear teeth, thus making it possible to produce true lead or helix angle within the limits of measurement accuracy.

It may be mentioned that the present invention is of the utmost importance in connection with relatively large and very expensive marine gears which in some cases tend to "unwind" during heat treatment and thus to produce uncompensatable errors in lead or helix angle.

For clarity, the method as previously described comprises the sequential steps of radial feed followed by traverse, followed by a second radial feed, followed by a second traverse, etc. As a matter of practice, it is unnecessary to eliminate traverse during radial feed. Instead, a relatively rapid radial feed may be combined with traverse to predetermined depth, after which the radial feed is terminated and the traverse continued as required to produce the effectively true lead.

The present invention is also efficient in correcting irregular errors which appear as lead errors differing in hand at opposite sides of the gear and which in fact are ordinarily caused by wobble of the gear.

The drawings and the foregoing specification constitute a description of the improved gear finishing with lead correction in such full, clear, concise and exact terms as to enable any person skilled in the art to practice the invention, the scope of which is indicated by the appended claims.

What I claim as my invention is:

1. A method of finishing gears to correct lead errors which comprises meshing a gear member and a gear-like tool member narrower than the gear member with their axes crossed to cause the teeth of the tool member to extend relative to the gear member at the desired lead and with the tool member located substantially midway between opposite sides of the gear member, rotating one of said members directly and the other member solely by the meshed engagement between said members, relatively feeding said tool member into said gear member radially thereof to a depth such that the teeth of the tool member are engaged from end to end, thereafter while continuing rotation relatively traversing said members in a plane parallel to the axes of both of said members in opposite directions, terminating such traverse while guiding action continues between the teeth of said members, thereafter repeating radial feed without traverse and successive reverse traverse to extend the finishing action to the ends of the gear teeth.

2. The method as defined in claim 1 which comprises preventing relative traverse between the gear-like tool member and the gear member during relative radial feed therebetween.

3. The method as defined in claim 1 which comprises initiating relative traverse between the gear-like tool member and the gear member simultaneously with radial feed, terminating radial feed at predetermined depth while continuing the aforesaid traverse to produce a continuous lead on the portions of the teeth of the gear member machined during such relative traverse.

4. The method as defined in claim 1 which comprises terminating traverse while approximately one-half of the tool teeth remains in contact with the gear teeth.

5. The method as defined in claim 1 which comprises returning the tool member to a central position with respect to the gear member for successive relative radial feed movements.

6. The method as defined in claim 1 in which said tool member is a shaving cutter having cutting edges extending up and down the sides of its teeth.

7. The method as defined in claim 6 in which opposite sides of the teeth of said cutter are longitudinally concave.

8. The method of correcting lead errors in gear teeth which comprises running the gear in mesh with a gear-like cutter with their axes crossed, and successively providing relative radial infeed between said gear and cutter with the cutter approximately midway between the sides of the gear followed by relative reciprocation at fixed center distance in a plane parallel to the axes of said gear and cutter, and extending the amount of reciprocation following each infeed until the finishing action of the cutter reaches the ends of the gear teeth.

References Cited in the file of this patent
UNITED STATES PATENTS

| | | |
|---|---|---|
| 2,270,422 | Drummond | Jan. 20, 1942 |
| 2,318,179 | Mentley | May 4, 1943 |
| 2,372,444 | Mentley | Mar. 27, 1945 |
| 2,435,405 | Praeg | Feb. 3, 1948 |
| 2,682,100 | Pelphrey | June 29, 1954 |